United States Patent
Loh et al.

(10) Patent No.: US 8,873,677 B1
(45) Date of Patent: Oct. 28, 2014

(54) APPARATUS AND METHOD FOR ENVELOPING TRACKING CALIBRATION

(71) Applicant: Samsung Electronics Co., Ltd, Suwon-si (KR)

(72) Inventors: Lup Meng Loh, Plano, TX (US); John Alex Interrante, Richardson, TX (US); William Hurley, Murphy, TX (US); Yaming Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/874,985

(22) Filed: May 1, 2013

(51) Int. Cl.
*H04L 25/49* (2006.01)
*H04L 27/00* (2006.01)
*H04L 25/08* (2006.01)

(52) U.S. Cl.
CPC .................................. *H04L 25/08* (2013.01)
USPC .......................................... 375/297; 375/295

(58) Field of Classification Search
CPC ........................... H03F 1/3247; H04L 27/368
USPC .................. 375/297.295, 297; 330/127, 149; 455/73
See application file for complete search history.

(56) References Cited

U.S. PATENT DOCUMENTS

| 2009/0097591 A1 | 4/2009 | Kim |
| 2010/0105338 A1 | 4/2010 | Wang et al. |
| 2013/0027129 A1 | 1/2013 | Langer |
| 2014/0084996 A1* | 3/2014 | Schwent et al. ............ 327/551 |
| 2014/0111362 A1* | 4/2014 | Strange et al. ............. 341/144 |

FOREIGN PATENT DOCUMENTS

KR          20130031465 A          3/2013

OTHER PUBLICATIONS

International Search Report dated Jan. 28, 2014 in connection with International Patent Application No. PCT/KR2013/008318, 3 pages.
Written Opinion of International Searching Authority dated Jan. 28, 2014 in connection with International Patent Application No. PCT/KR2013/008318, 5 pages.
Cao, et al.; "Digital Predistortion for High Efficiency Power Amplifier Architectures Using a Dual-Input Modeling Approach"; IEEE Transactions on Microwave Theory and Techniques, vol. 60, No. Feb. 2, 2012; pp. 361-369.

* cited by examiner

*Primary Examiner* — Khai Tran (57) ABSTRACT

An apparatus for envelope tracking calibration for use in a wireless communication is provided. The apparatus includes a transmission signal path configured to carry a transmission signal to an antenna. An envelope signal path configured to feed an envelope signal with an envelope tracking power amplifier. A controller is configured to transmit a normal envelope signal being generated in a normal operation mode and measure a first Adjacent Channel Leakage Ratio (ACLR) corresponding to the normal envelope signal. The controller is further configured to transmit a comparison envelope signal being generated in a comparison operation mode and measure a second ACLR corresponding to the comparison envelope signal. The controller is configured to calculate a time misalignment between the transmission signal path and the envelope signal path based on a difference between the first and second ACLRs.

20 Claims, 6 Drawing Sheets

APPARATUS AND METHOD FOR ENVELOPING TRACKING CALIBRATION

TECHNICAL FIELD

The present application relates generally to envelope tracking transmitter for a wireless communication, more specifically, to an apparatus and method for envelope tracking calibration using Adjacent Channel Leakage Ratios (ACLRs).

BACKGROUND

Intense efforts in recent years have surrounded work in improving transmitter efficiency, especially for mobile terminals (User Equipment, UE) to extend battery life. It is also an area of focus for network equipment to reduce heat dissipation. Given that most of the transmitter efficiency as well as RF performances are dominated by the power amplifier (PA), various techniques have been implemented. This has included Polar PA architecture, Doherty PA design, PA output load tuning, and others.

One of the most notable and has been steadily gaining attention as the method of choice is Envelope Tracking (ET). This technique describes a varying bias voltage for the PA driven by a custom designed modulator, which tracks the envelope of the RF signal to be transmitted at the output of the PA. The purpose is to reduce bias overhead (i.e., power overhead) to what is necessary to amplify the Radio Frequency (RF) signal. This results in significant Power Added Efficiency (PAE) improvement on the PA but at the expense of linearity, which is traditionally achieved from bias overhead that we have removed with ET.

As such, some form of pre-distortion techniques need to accompany the implementation of ET, the most common being Digital Pre-Distortion (DPD). Linearization is necessary for ET transmitter to meet Adjacent Channel Leakage Ratio (ACLR)/Adjacent Channel Power Ratio (ACPR) mask requirements. However, in order for DPD to work the envelope signal and the transmission signal path signal must be time aligned at the ET transmitter. Otherwise, instantaneous waveform clipping by envelope misalignment will cause nonlinearity.

SUMMARY

An apparatus for envelope tracking calibration for use in a wireless communication is provided. The apparatus includes a transmission signal path configured to carry a transmission signal to an antenna. An envelope signal path is configured to feed an envelope signal with an envelope tracking power amplifier (PA). A controller is configured to transmit a normal envelope signal generated in a normal operation mode and measure a first Adjacent Channel Leakage Ratio (ACLR) corresponding to the normal envelope signal. The controller is further configured to transmit a comparison envelope signal generated in a comparison operation mode and measure a second ACLR corresponding to the comparison envelope signal. The controller is configured to calculate a time misalignment between the transmission signal path and the envelope signal path based on a difference between the first and second ACLRs.

A method for envelope tracking calibration for use in a wireless communication is provided. The method includes transmitting a normal envelope signal that is produced in a normal operation mode and measuring a first Adjacent Channel Leakage Ratio (ACLR) corresponding to the normal envelope signal. The method further includes transmitting a comparison envelope signal that is generated in a comparison operation mode and measure a second ACLR corresponding to the comparison envelope signal and measure a second ACLR corresponding to the normal envelope signal. The method also includes calculating a time misalignment between the transmission signal path and the envelope signal path based on a difference between the first and second ACLRs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication technologies.

Figure 1:
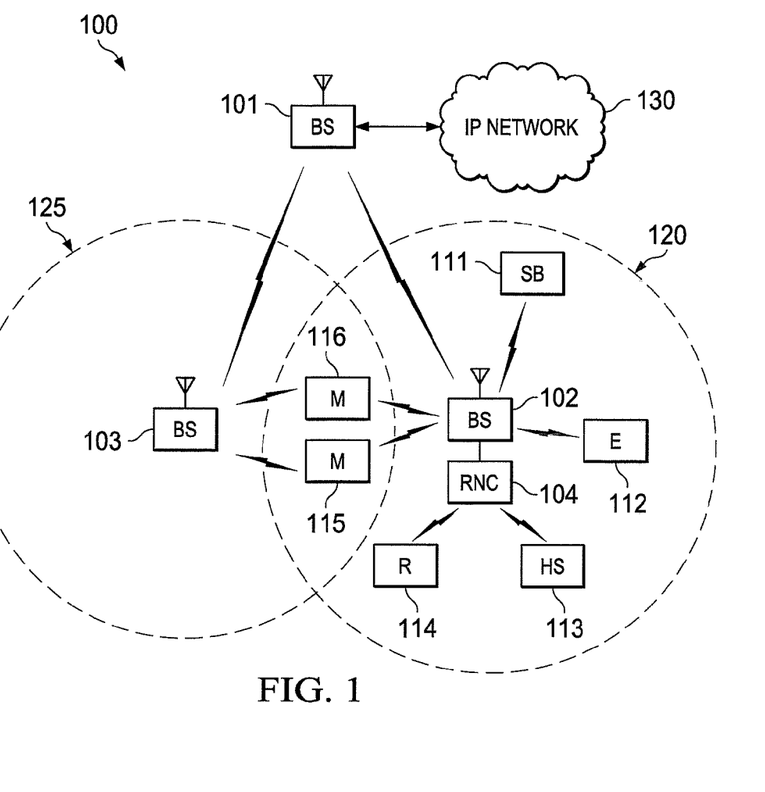
FIG. 1 illustrates a wireless communication network, according to embodiments of the present disclosure.

FIG. 1 illustrates a wireless communication network, according to embodiments of the present disclosure. The embodiment of wireless communication network 100 illustrated in FIG. 1 is for illustration only. Other embodiments of the wireless communication network 100 could be used without departing from the scope of the present disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout the present disclosure, the term mobile station (MS) is interchangeable with the term subscriber station (SS). The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques including techniques for: envelope tracking calibration as described in embodiments of the present disclosure.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
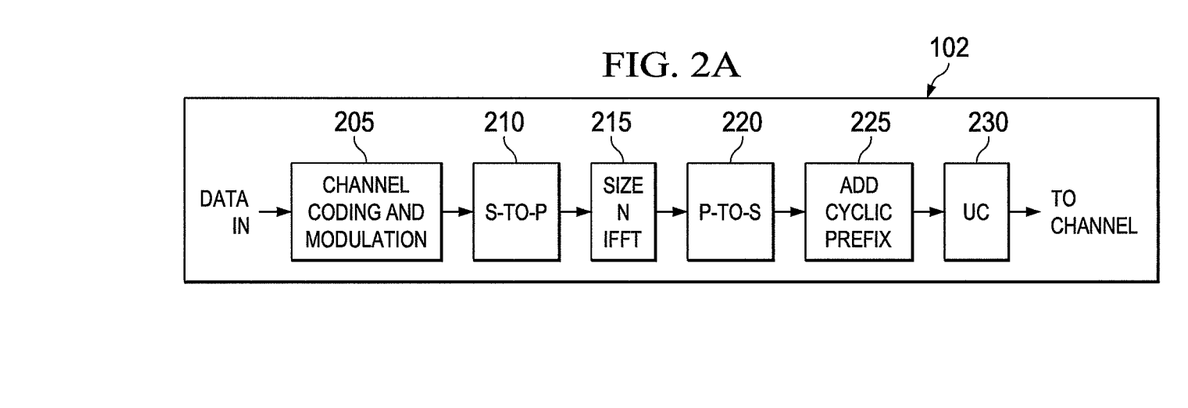
FIG. 2A is a high-level diagram of an orthogonal frequency division multiple access (OFDMA) or millimeter wave transmit path, according to embodiments of the present disclosure.
Figure 2B:
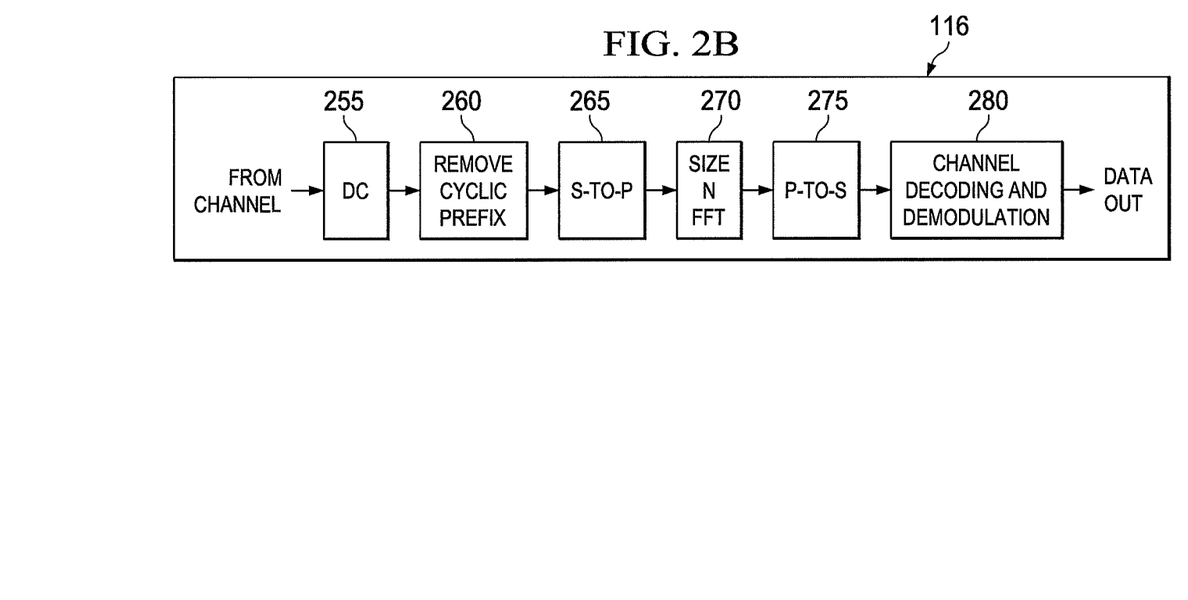
FIG. 2B is a high-level diagram of an OFDMA or millimeter wave receive path, according to embodiments of the present disclosure.

FIG. 2A is a high-level diagram of an orthogonal frequency division multiple access (OFDMA) or millimeter wave transmit path, according to embodiments of the present disclosure. FIG. 2B is a high-level diagram of an OFDMA or millimeter wave receive path, according to embodiments of the present disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In one embodiment of the present disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carryout beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times. Multicast and unicast data and control signals and messages can be transmitted in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carryout beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3:
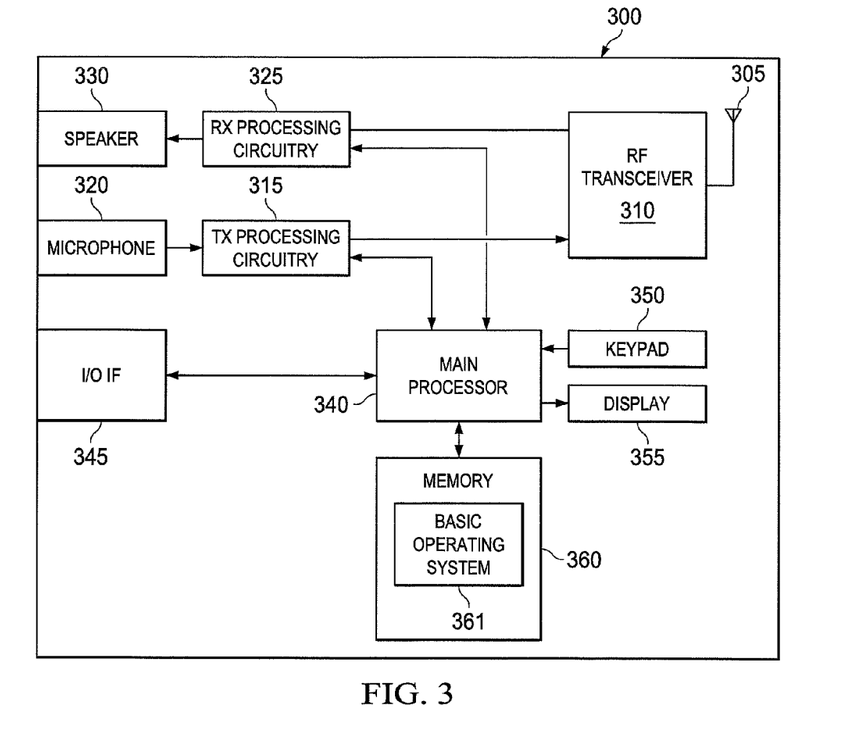
FIG. 3 illustrates a subscriber station according to embodiments of the present disclosure.

FIG. 3 illustrates a subscriber station according to an exemplary embodiment of the disclosure.

In certain embodiments, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 960 in order to control the overall operation of wireless subscriber station 116. In one such operation, main processor 340 controls the reception of forward channel signals and the transmission of reverse channel signals by radio frequency (RF) transmitter 910, receiver (RX) processing circuitry 325, and transmitter (TX) processing circuitry 315, in accordance with well-known principles.

Main processor 340 is capable of executing other processes and programs resident in memory 360, such as operations for envelope tracking calibration as described in embodiments of the present disclosure. Main processor 340 can move data into or out of memory 360, as required by an executing process. In some embodiments, the main processor 340 is configured to execute a plurality of applications 362, such as applications for CoMP communications and MU-MIMO communications. The main processor 340 can operate the plurality of applications 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 940.

Main processor 340 is also coupled to keypad 350 and display unit 355. The operator of subscriber station 116 uses keypad 950 to enter data into subscriber station 116. Display 355 may be a liquid crystal display capable of rendering text and/or at least limited graphics from web sites. Alternate embodiments may use other types of displays.

Figure 4:
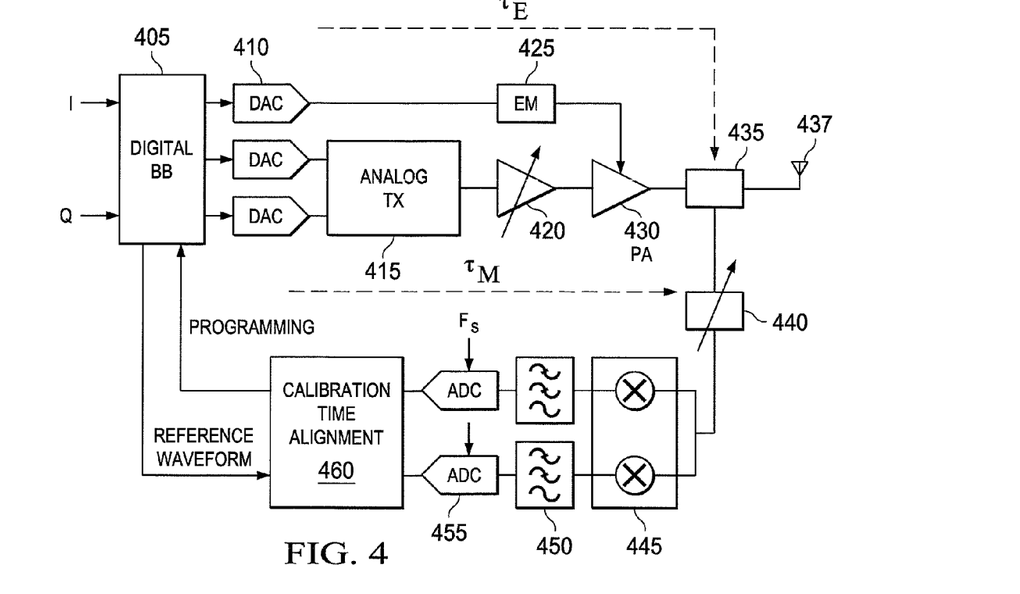
FIG. 4 illustrates the Envelope Tracking (ET) transceiver according to embodiments of the present disclosure.

FIG. 4 illustrates the Envelope Tracking (ET) transceiver 400 according to embodiments of the present disclosure. The embodiment of the ET transceiver 400 shown in FIG. 4 is for illustration only. Other embodiments of the ET transmitter 400 could be used without departing from the scope of the present disclosure. For example, the functions of a digital baseband processor 405 and a calibration unit 460 could be incorporated into a single FPGA device, processor, or ASIC, or a combination thereof.

The ET transmitter 400 includes a Digital Baseband Processor (DBP) 405, Digital-to-Analog Converters (DACs) 410, an envelope modulator 425, an analog Transmitter (TX) 415, a pre-Power Amplifier (pre-PA) 420, an envelope tracking Power Amplifier (PA) 430, an output unit 435, a mixer 445, anti-alias filters 450, Analog-to Digital Converters (ADCs) 455, and a calibration unit 460.

The DBP 405 receives a baseband signal to be transmitted. The DBP 405 distributes the signal into transmission signal paths ($\tau_M$) and an envelope signal path ($\tau_E$). In the transmission signal paths, the DBP 405 pre-distorts and provides the signal to the DACs 410 for conversion to an analog signal. The analog signals output from the DACs 410 are up-converted at the analog TX 415 and then amplified at the envelope tracking PA 430 for transmission.

In the envelope signal path, the DBP 405 implements an envelope tracking algorithm and produces an envelope signal of a baseband signal. The envelope signal proceeds to the envelope modulator 425 through the DAC 410, and is fed with the PA 430 which amplifies the transmission signals under the principle of envelope tracking.

The amplified signal is transmitted to an antenna 437 through the output unit 435. At the output unit 435, the amplified signal is branched off to the mixer 445 where the signals are down-converted, and then digitalized at the ADC 455, after passing anti-alias filters 450. The signals are then finally fed back to calibration unit 460.

The transmission signal paths and the envelope signal should be time aligned with very high accuracy in order to maintain linearity in envelope tracking PA. The calibration unit 460 compares the feedback signal to the reference signal received from the DPB or in order to determine an amount of misalignment between the transmission signal paths ($\tau_M$) and the envelope signal path ($\tau_E$), and calculates a delay offset to correct the misalignment using the difference of ACLR measurements described below in detail. Thus, the combination of DBP and the envelope tracking PA provides a substantially linear system since the DBP acts as the inverse model of the PA.

Figure 5:
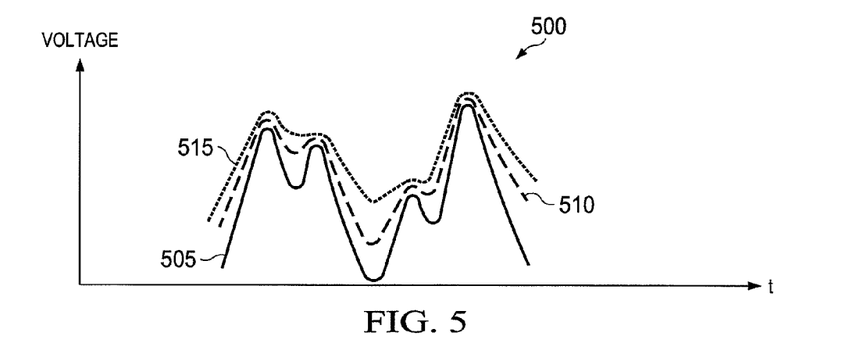
FIG. 5 depicts example baseband signal and envelope signals according to embodiments of the present disclosure.

FIG. 5 depicts a baseband signal and two envelope signals 500 according to embodiments of the present disclosure. The embodiment of the baseband signal and two envelope signals 500 whose in FIG. 5 is for illustration only. Other embodiments of the signal graphs could be used without departing from the scope of the present disclosure.

In the example shown in FIG. 5, a curve 505 represents a baseband signal to be transmitted. A curve 510 represents a normal envelope signal produced at DPB 405 in normal operation mode from the curve 505. In embodiments of the present disclosure, for a normal operation mode, the envelope tracking algorithm employs, for example, a polynomial expression to produce an envelope signal of the baseband signal, expressed in Equation 1:

$$Y = a_1 + b_1 x + c_1 x^2 + d_1 x^3 + \quad (1)$$

where $a_1, b_1, c_1, d_1 \ldots$ are positive or negative constants. In one embodiment, for a normal operation mode, the constant and the coefficients can be determined to reduce or minimize the power supplied to the envelope tracking PA, or improve or maximize the efficiency of an envelope tracking PA. It is noted that the envelope tracking algorithm for a normal operation mode is not limited to a polynomial series, but can use any suitable mathematical expressions including as non-polynomial equations to produce a normal envelope signal.

A curve 515 represents a comparison envelope signal produced at DBP in a comparison operation mode from the baseband signal 505. The comparison envelope signal has a lower tracking efficiency or performance than that of the normal envelope signal. In embodiments where the normal operation mode employs a polynomial series, the comparison operation mode also can employs a polynomial expression to produce a comparison envelope signal the baseband signal, expressed in Equation 2:

$$Y = a_2 + b_2 x + c_2 x^2 + d_2 x^3 + \quad (2)$$

where $a_2, b_2, c_2, d_2 \ldots$ are positive or negative constants.

In one embodiment, for a comparison operation mode, the constant and the coefficients can be determined to be different from those of normal operation mode, and to have less efficiency of the envelope tracking than that of the normal operation mode. It is noted that the envelope tracking algorithm for a normal operation mode is not limited to a polynomial series, but can use any suitable mathematical expressions including as non-polynomial equations to produce an envelope signal.

Figure 6:
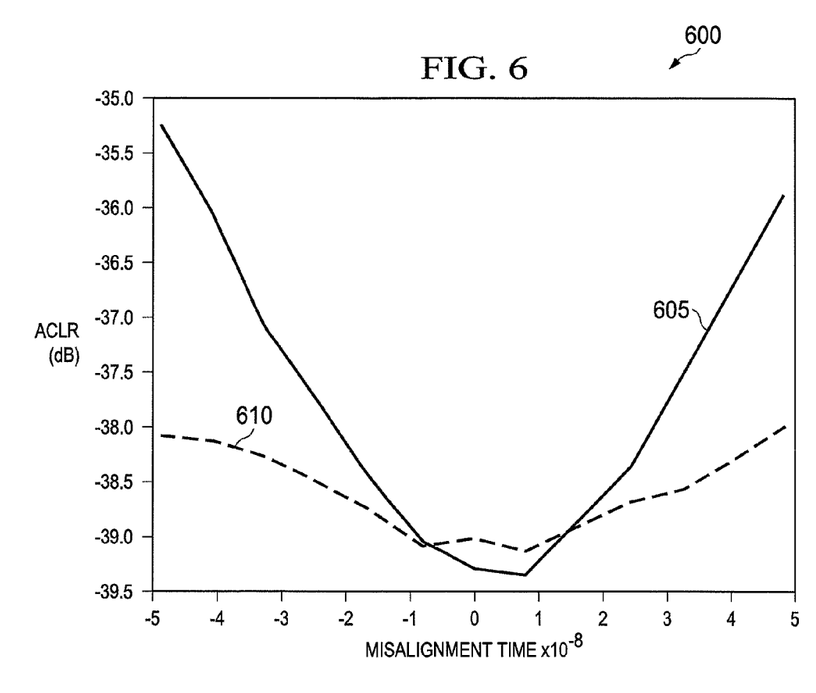
FIG. 6 depicts two ACLR graphs according to embodiments of the present disclosure.

FIG. 6 depicts two ACLR graphs 600 according to one embodiment of the present disclosure. The embodiment of the two ACLR graphs 600 shown in FIG. 6 is for illustration only. Other embodiments of the ACLR graphs could be used without departing from the scope of the present disclosure.

In the example shown in the FIG. 6, a graph 605 is for ACLR corresponding to the normal envelope signal produced in the normal operation mode, and a graph 610 for ACLR corresponding to the comparison envelope signal produced in the comparison operation mode.

The graphs in FIG. 6 show that ACLRs degrade with larger time misalignment, and the extent of the relationship for a PA in turn depends on the tracking efficiency of the envelope signal and the effective bandwidth of the uplink signal. The ACLRs difference between normal and comparison envelope signals can be theorized as follows: for the case of near-ideal envelope signal (i.e., normal envelope signal) being provided to a PA input, any given PA input power will correspond to only one PA bias value from the envelope signal and thus, to only one PA output power value. However, as the envelope signal varies from the ideal alignment with respect to the PA input, the PA bias will also vary from the near-ideal value for any giving PA input power. Therefore, for any given PA input power, the output power may vary slightly due to the misaligned envelope, resulting in non-linear PA behavior that impacts ACLR. Laboratory measurement results are consistent with the theoretical understanding that at higher efficiency envelopes, the ACLR depreciate more with every nanosecond of misalignment.

Using an envelope signal with just a few percentage of lower efficiency, ACLR depreciation becomes almost insignificant over tens of nanoseconds of misalignment as the curve 402 shows. Thus, by means of capturing the ACLR-misalignment relationship for each of these two envelope signals, time misalignment can be estimated from the difference of ACLR measurements between the normal and comparison envelope signal.

Figure 7:
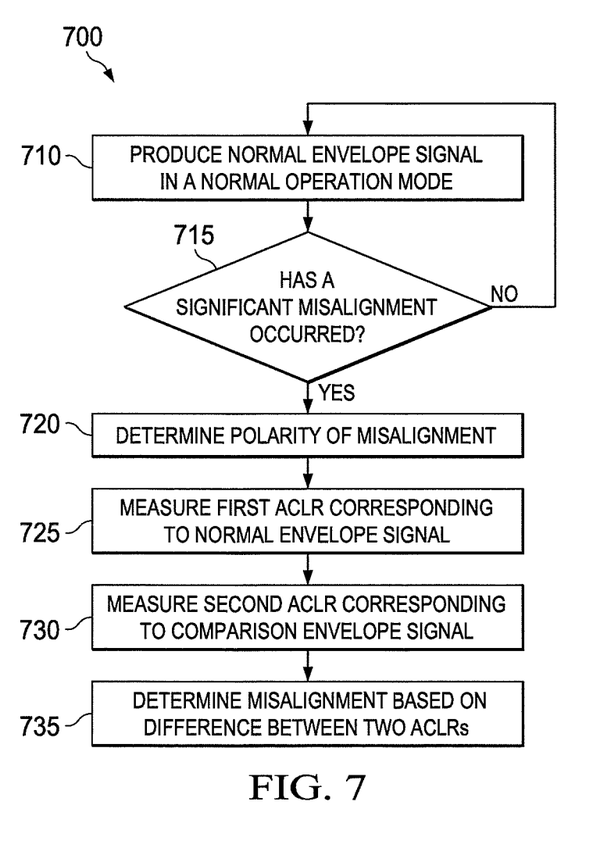
FIG. 7 is a high level flow chart illustrating a process of estimating time alignment in ET transmitter according to embodiments of the present disclosure.

FIG. 7 is a high level flow chart 700 illustrating a process of estimating time alignment in envelope tracking transmitter according to the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

The process 700 adopts the difference between the ACLR measurements taken when operating in a normal operation mode and a comparison operation mode. This eliminates statistical measurement variations that otherwise affects absolute ACLR measurements. Since the most aggressive envelope is normally used in operation to maximize efficiency, a temporal tracking function relaxation for a better ACLR to provide the needed delta measurement should not violate any RF performance requirements, thereby affording network friendly operations.

The process 700 begins with step 710, where the DBP 401 produces an envelope signal using an envelope tracking algorithm in a normal operation mode. The envelope signal is fed with the envelope tracking PA amplifying the transmission signals via the envelope modulator 405.

In step 715, the calibration unit 460 polls at pre-determined interval if a significant misalignment has occurred, for example, by means of the cross-correlation between the fed back signal and the reference uplink signal from the DBP. In one embodiment, the significant misalignment occurs when an amount of misalignment is above a predetermined level. Upon the polling at predetermined interval, the calibration unit 460 compares the feedback signal to the reference signal in order to determine an amount of misalignment between the transmission signal paths ($\tau_M$) and the envelope path ($\tau_E$), and initiate calibration process upon the occurrence of the significant misalignment.

In step 720, when calibration process is triggered, the calibration unit 460 determines the polarity of misalignment, or whether the misalignment is positive (i.e., slower) or negative (i.e., faster). To determine the polarity, the process 700 uses the cross-correlation between the fed back signal and the reference uplink signal provided from the DBP to determine and at the same time to determine the polarity of delay mismatch (i.e., slower or faster than a default delay offset). Step 720 eliminates ambiguity resulted from that ACLR almost symmetrically degrades regardless of the polarity of misalignment, as can observed in the sweep plots as illustrated in FIG. 6.

In step 725, the calibration unit 460 measures and averages the first ACLR corresponding to the normal envelope signal, for example, in the next suitable uplink timeslot right after the calibration process was triggered.

In step 730, the calibration unit 460 implements the tracking algorithm under the comparison operation mode, and produces a comparison envelope signal. In embodiments, the comparison envelope signal has low tracking efficiency than that of a normal envelope signal. Consequently, the comparison envelope signal is transmitted to the envelope tracking PA that amplifies the RF signals according to the comparison envelope signal.

In step 735, the calibration unit 460 measures and averages the second ACLR corresponding to the comparison envelope signal, for example, all within the same timeslot in which the first ACLR was measured.

In step 740, the calibration unit 460 computes difference between the two ACLRs and determine the amount of the misalignment. In one embodiment, the process includes a default offset pre-programmed based on manufacturer calibration. In another embodiment, the process 700 includes a look-up table (LUT) to map each of the differences between the two ACLRs to the corresponding delay offsets. The calibration unit determines a delay offset by consulting the LUT using the ACLRs difference and provides the delay offset with the polarity information to the DBP which delays either the transmission signals or the envelope signal according to the amount and the polarity of the delay offset.

Besides the tracking operation modes, ACLR versus time misalignment also depends on a signal bandwidth. ACLR degrades more gradually with misalignment as effective bandwidth reduces while keeping the same tracking operation mode. Therefore, at a lower effective bandwidth (i.e., smaller RB allocations) the difference between ACLRs becomes smaller and less accurate.

As such, the process 700 uses the cross-correlation between the feedback signal and the reference uplink signal provided from the DBP to determine if the delay is significant enough to initiate such a calibration process and at the same time to determine the polarity of delay mismatch (i.e., slower or faster than a default delay offset).

In actual operation, terminal uplink signals are rarely allocated full Resource Blocks (RBs) in the case of LTE, which together with the choice of modulation depends on the amount of data the user needs to send out. As such, the ACLR measurements need to be taken adjacent to the useful spectrum and not necessarily the standard 3GPP Standards mask. The Standards require that the RB allocation on the uplink be contiguous easing such measurements.

The process 700 uses operational uplink signals for calibration in real time without degrading RF performance, and with minimum latency. At the same time, it permits time alignment at a practical resolution compared with the legacy method of auto-correlation.

The present disclosure provides an in-network closed loop Envelope Tracking (ET) time alignment without transceiver performance detriments while using only live operation signals. The proposed calibration relies on the relationship between ACLR versus time misalignment. The embodiments according to the present disclosure allow time alignment calibration to be performed in factory with the delay offset stored onto the transmitter digital baseband as default setting without any means to recalibrate during actual operations. This effect solves the issue as various measurements on ET transmitter design on CMOS ASIC shows significant delay drifts over temperature, voltage, and settings during operations. Further, the use of auto-correlation processing on the fed back PA output signal has been proposed for determining the delay discrepancies between the envelope and transmission signal path. The concept revolves around the two signal envelope having a delay offset between them that will appear as two peaks in time domain after auto-correlation.

The resolution of the embodiments according to the present disclosure depends on the signal bandwidth, and the ability to achieve two distinguishable peaks also depends on the magnitude of delay offsets between the two paths. In order to accurately distinguish the two peaks and accurately process the time delay, a LTE 10 MHz signal will require hundreds of nanoseconds in delay discrepancies. The attempts may be done in factory to insert large offset for this calibration method to work rather than in a UE, but will degrade the RF performance so much that it will not be allowed for actual operation in the network. Alternative highly accurate alignment methods also include transmitting know signals at different times to the PA input through the data path and then to the PA bias through the envelope. The resulting data allows for accurate estimates of latency differences in the paths. However, transmissions of useful signals for time alignment with such a two-step method cause the terminal to violate air interface standards.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the stent or connector embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for envelope tracking calibration for use in a wireless communication, comprising:
   a transmission signal path configured to carry a transmission signal to an antenna;
   an envelope signal path configured to feed an envelope signal with an envelope tracking power amplifier (PA); and
   a controller configured to:
   transmit a normal envelope signal generated in a normal operation mode and measure a first Adjacent Channel Leakage Ratio (ACLR) corresponding to the normal envelope signal, transmit a comparison envelope signal generated in a comparison operation mode and measure a second ACLR corresponding to the comparison envelope signal, and calculate a time misalignment between the transmission signal path and the envelope signal path based on a difference between the first and second ACLRs.

2. The apparatus according to claim 1, wherein the comparison envelope signal has less tracking efficiency than that of the normal envelope signal.

3. The apparatus according to claim 1, wherein the normal and comparison envelope signals are produced using either polynomial expressions with different coefficients or non-polynomial expressions with different coefficients.

4. The apparatus according to claim 3, wherein the polynomial expression for normal expression is as follow:

$$Y = a_1 + b_1 x + c_1 x^2 + d_1 x^3 +$$

where $a_1, b_1, c_1, d_1 \ldots$ are positive or negative constants.

5. The apparatus according to claim 1, wherein the controller is configured to average the measured first and second ACLRs.

6. The apparatus according to claim 1, wherein the controller is configured to determine whether the misalignment is positive or negative.

7. The apparatus according to claim 1, wherein the controller is configured to trigger calibration when an amount of misalignment is above a predetermined level.

8. The apparatus according to claim 1, wherein the first and second ACLRs are measured within the same timeslot.

9. The apparatus according to claim 1, wherein the controller is configured to consult a look up table with the difference between two ACLRs to determine a delay offset.

10. The apparatus according to claim 9, wherein the controller is configured to delay either the transmission signal or the envelope signal based on the delay offset.

11. A method for envelope tracking calibration for use in a wireless communication, comprising:

transmitting a normal envelope signal produced in a normal operation mode and measuring a first Adjacent Channel Leakage Ratio (ACLR) corresponding to the normal envelope signal;

transmitting a comparison envelope signal generated in a comparison operation mode and measuring a second ACLR corresponding to the comparison envelope signal and measure a second ACLR corresponding to the normal envelope signal; and calculating a time misalignment between the transmission signal path and the envelope signal path based on a difference between the first and second ACLRs.

12. The method according to claim 11, wherein the comparison envelope signal has less tracking efficiency than that of the normal envelope signal.

13. The method according to claim 11, wherein the normal and comparison envelope signals are produced using either polynomial expressions with different coefficients or non-polynomial expressions with different coefficients.

14. The method according to claim 13, wherein the polynomial expression for normal expression is as follow:

$$Y = a_1 + b_1 x + c_1 x^2 + d_1 x^3 +$$

where $a_1, b_1, c_1, d_1 \ldots$ are positive or negative constants.

15. The method according to claim 11, wherein the method averages the measured first and second ACLRs.

16. The method according to claim 11, wherein the method determines whether the misalignment is positive or negative.

17. The method according to claim 11, wherein the method triggers calibration when an amount of misalignment is above a predetermined level.

18. The method according to claim 11, wherein the first and second ACLRs are measured within the same timeslot.

19. The method according to claim 11, wherein the method consults a look up table with the difference between two ACLRs to determine a delay offset.

20. The method according to claim 19, wherein the method delays either the transmission signal or the envelope signal based on the delay offset.

* * * * *